United States Patent [19]

Vaughen

[11] 4,077,489
[45] Mar. 7, 1978

[54] DYNAMIC FLUID SYSTEM FOR IMPROVING STABILITY OF A FLUID CUSHION VEHICLE

[76] Inventor: Jack F. Vaughen, 26807 Spring Creek Rd., Rancho Palos Verdes, Calif. 90274

[21] Appl. No.: 652,374

[22] Filed: Jan. 26, 1976

[51] Int. Cl.² .............................................. B60V 1/00
[52] U.S. Cl. ................... 180/124; 180/125; 180/127
[58] Field of Search ............... 180/124, 125, 127, 128, 180/129, 130; 280/702

[56] References Cited

U.S. PATENT DOCUMENTS

| | | | |
|---|---|---|---|
| 3,247,921 | 4/1966 | Latimer-Needham | 180/124 |
| 3,756,342 | 9/1973 | Burdick | 180/125 |
| 3,757,699 | 9/1973 | Wirth | 180/124 |
| 3,768,588 | 10/1973 | Vaughen | 180/124 |
| 3,796,279 | 3/1974 | Burdick | 180/125 |
| 3,825,093 | 7/1974 | Burdick | 180/125 |
| 3,857,456 | 12/1974 | Schrink | 180/124 |

*Primary Examiner*—Philip Goodman
*Assistant Examiner*—John A. Carroll

[57] ABSTRACT

An annular sealing member extends to ground level to minimize loss of fluid from a lifting cushion. This member includes an inflatable seal hanger envelope mounted on the underside of a fluid cushion vehicle. The inflatable hanger envelope is inflated from the lifting fluid cushion through a tube. The length of this inflation tube is great compared with its bore diameter, thereby producing a pressure drop in the fluid as it flows between the fluid cushion and the hanger envelope. The hanger envelopes of adjacent fluid cushions are also interconnected when the vehicle is supported on four or more fluid cushions. These interconnections divide the total number of fluid cushions into only three independent groups to produce a statically determinant support for the fluid cushion vehicle.

1 Claim, 7 Drawing Figures

DYNAMIC FLUID SYSTEM FOR IMPROVING STABILITY OF A FLUID CUSHION VEHICLE

BACKGROUND OF THE INVENTION

This invention is directed to improvements in a load bearing fluid cushion vehicle of the general type disclosed in my U.S. Pat. No. 3,768,588 issued Oct. 30, 1973, entitled "Structure to Form a Load Bearing Air Cushion for a Vehicle", which patent is hereby incorporated into the present disclosure by reference.

U.S. Pat. No. 3,768,588 discribes a load bearing apparatus for a fluid cushion vehicle which is capable of containing a lifting fluid cushion between the underside of the vehicle and the surface over which the vehicle is operated. This apparatus is characterized by an annular seal assembly which encompasses and contains the lifting fluid cushion. This annular seal assembly includes an upper inflatable hanger envelope and a lower flexible seal. U.S. Pat. No. 3,768,588 teaches that it is advantageous to place the inflatable hanger envelope in series with the fluid cushion cavity so that the hanger envelope is inflated from the fluid cushion. However, experience has shown that undesirable dynamic interactions between these series-connected cavities may occur under some conditions. The present invention describes means for retaining the advantages of inflating the hanger envelope automatically from the fluid cushion while effectively providing dynamic isolation between the fluid cushion and the hanger envelope.

A second problem occurs in fluid cushion vehicles constructed in accordance with the teachings of U.S. Pat. No. 3,768,588, if they employ four or more lifting fluid cushions to support the vehicle. In such vehicles, if all lifting cushions operate independent of each other, a statically indeteriminant condition can develop in which fluid cushions located under diagonally opposite corners of the vehicle attempt to support the total weight of the vehicle while the other fluid cushions fail to pressurize sufficiently to carry their share of the load. This problem is solved in the present invention by interconnecting the inflatable hanger envelopes of the fluid cushions in such a manner as to produce only three independent sets or groups of fluid cushions. These three groups of fluid cushions then pressurize equally and share the total weight of the vehicle in a statically determinant manner.

SUMMARY OF THE INVENTION

This invention relates to that class of vehicles commonly called "air cushion vehicles" which support and transport loads on cushions of pressurized air. However, alternate pressurized fluids such as water may be employed as the lifting medium in such vehicles. Therefore, throughout this disclosure, the word "fluid" is used in the broad sense to mean either gas or liquid.

One object of this invention is to place the hanger envelope in series with the lifting fluid cushion and yet to do so in a manner which dynamically isolates the hanger envelope from the fluid cushion. This object of the invention is accomplished by employing a passage or tube to interconnect the two pressurized areas and to cause a pressure drop between them.

A second object of the invention is to remove the cause of static instability inherent in a fluid cushion vehicle of this type which employs four or more lifting cushions. It has been discovered that this static instability can be eliminated if the inflatable hanger envelopes are connected together by passages to produce only three independent groups of lifting fluid cushions.

DESCRIPTION OF THE DRAWINGS

In the drawings, which are to be regarded as merely illustrative.

DESCRIPTION OF THE INVENTION

Figure 1:
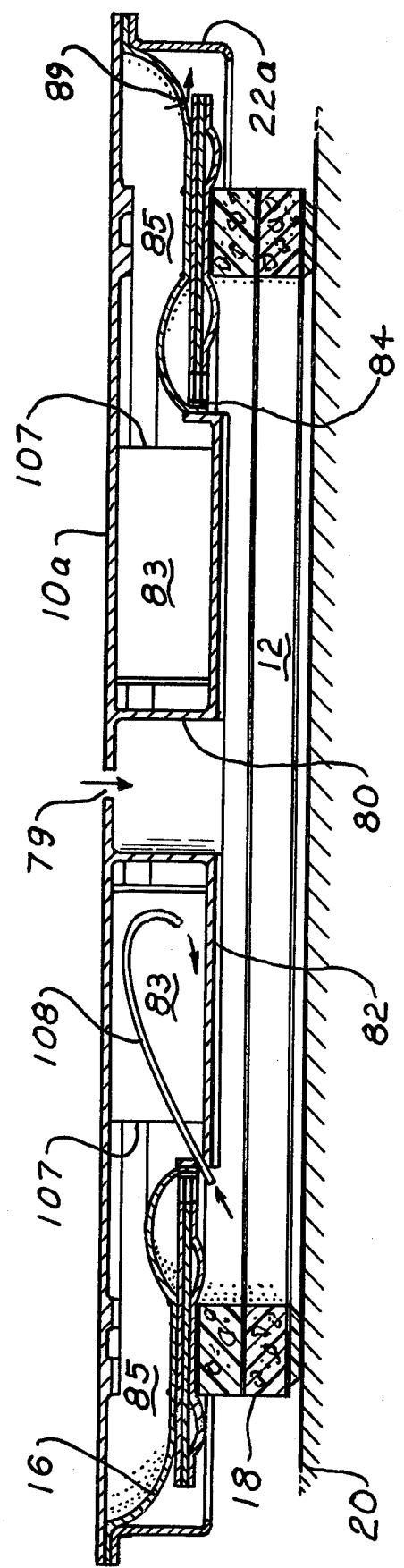
FIG. 1 is a somewhat diagrammatic view of an axial section of a sealing assembly that embodies the present invention. This figure corresponds to FIG. 7 of issued U.S. Pat. No. 3,768,588.

Referring to FIG. 1, the preferred embodiment of the fluid cushion structure in this invention is an annular sealing assembly that is mounted on the underside of a load-bearing base 10a of a vehicle to enclose a cavity 12 for the formation of a lifting cushion which is continually supplied with pressurized fluid from a suitable source through an inlet orifice 79. The annular sealing assembly which confines the fluid cushion comprises an annular downwardly inflatable hanger envelope, generally designated 16, in combination with a dependent annular sealing means, generally designated 18, that is impervious to fluid flow therethrough and projects downwardly from the hanger into close proximity with the ground surface 20. The outer periphery of annular hanger envelope 16 is enclosed by a suitable annular guard 22a which not only serves the purpose of protecting the annular inflatable hanger envelope from damage but also may serve to attach the outer edge of hanger envelope 16 to the underside of load-bearing base 10a in a fluid tight manner.

The underside of base 10a is also fitted with a downwardly projecting inner cylindrical ring 80 and a horizontal circular base plate 82. The lower edge of cylindrical ring 80 is attached in fluid tight manner to the rim of a circular hole in the center of base plate 82. Spacer blocks 107 may also be placed between base plate 82 and load-bearing base 10a. This central structure provides support for the load-bearing base 10a when no pressurized fluid is supplied to generate a lifting cushion in the cavity 12 and serves to prevent the dead weight from crushing seals 18. The inner peripheral edge of inflatable hanger envelope 16 is attached to the outer edge of circular base plate 82 by a suitable band tension clamp 84 so that the inflatable hanger envelope completes an annular chamber 85 that surrounds and opens into the central annular chamber 83.

FIG. 1 shows the preferred method of introducing pressurized fluid into the inflatable hanger envelope. In this method, fluid is allowed to flow from the lifting cushion cavity 12 into annular cavity 83 through a tube 108 which is preferably inserted through a tight-fitting hole in the central support structure. Since annular cavity 83 communicates with interior 85 of the inflatable seal hanger envelope, pressurized fluid which flows through tube 108 will cause the seal hanger envelope to inflate. As described in U.S. Pat. No. 3,768,588 it is desirable that fluid pressure inside the seal hanger envelope be lower than fluid pressure inside the cushion cavity 12. This pressure differential is established by empirically adjusting the length of tube 108 in relation to its bore diameter to produce the required pressure drop as fluid flows from the cushion cavity 12 into the central cavity 83. It is desirable that fluid pressure inside the hanger envelope 85 be between 50 and 75% of the pressure inside the fluid cushion cavity 12. By placing the hanger envelope in series with the fluid cushion and interconnecting them with tube 108 this relationship is automatically maintained because of the pressure drop which develops along the length of the tube. For such a pressure drop to develop, however, it is necessary for a continuous flow of fluid to pass through tube 108. Therefore, one or more orifices 89 are provided in the outer wall of hanger envelope 16 to allow pressurized fluid to escape from the interior of the hanger envelope 85 to atmosphere at a controlled rate. The impedance of orifice 89 is established in conjunction with the impedance of tube 108 to fix the fluid flow rate required to maintain the desired pressure drop between cushion cavity 12 and hanger cavity 85. Since tube 108 typically has a length which is very long compared to its bore diameter, its impedance is sufficient to dynamically isolate hanger cavity 85 from cushion cavity 12 while still allowing fluid to flow through the tube. This retains the advantage of inflating the hanger envelope automatically from the lifting cushion without inducing dynamic instability due to possible interaction between these two pressurized cavities.

Figure 2:
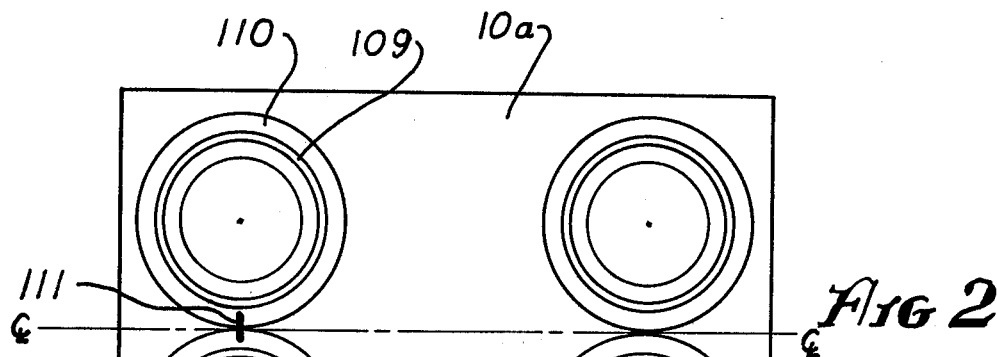
FIG. 2 is a schematic underside plan view of a load bearing structure, which may be a platform or container for example, fitted with four lifting cushions.

If an air cushion vehicle of this type employs four or more independent lifting cushions, a statically indeterminant condition can develop in which fluid cushions located under diagonally opposite corners of the vehicle attempt to support the total weight of the vehicle while the other fluid cushions fail to inflate sufficiently to carry their share of the load. This problem is overcome in this invention by interconnecting the inflated hanger envelopes of adjacent seals so that the lifting cushions are divided into three independent groups or sets. How this is done for a vehicle supported on four cushions is shown in FIG. 2. That figure is an underside plan view of a load bearing structure 10a which may be a platform or container for example, fitted with four lifting cushions. In each of these lifting cushions, the annular area 109 represents the flexible seal element while the annular area 110 represents the inflatable hanger envelope. To make the four lifting cushions in FIG. 2 function as a statically determinant lifting system, the inflatable hanger envelopes of two adjacent seals are interconnected by a tube III. This interconnecting tube may be mounted inside of base structure 10a. However, if the lifting cushions are mounted under the corners of a large open structure, such as a work stand or scaffold for example, the interconnect tube can be either a flexible hose or a rigid pipe which is external to the structure. In either case, its function is to equalize pressure in the inflated hanger envelopes of the two interconnected seals. The two interconnected lifting cushions then function as a single unit and the four-cushion vehicle then becomes a statically determinant system which causes all four cushions to provide only three supports to share in lifting the load.

As previously described, the hanger envelope of each fluid cushion is inflated from the fluid cushion and exhausts to atmosphere through a fixed orifice. Therefore, a fixed relationship exists between the pressure inside the cushion cavity and the corresponding pressure inside the hanger envelope associated with that cushion. However, if two adjacent hanger envelopes are interconnected by a tube such as 111 in FIG. 2, and this tube is of sufficient diameter to pass air freely between the two interconnected hanger envelope cavities, no pressure differential can develop between these hanger cavities. Then the common pressure which exists inside these two interconnected hanger cavities will be intermediate between the pressures which would have existed in them if they were not interconnected. Since the hanger pressure determines the effectiveness of the seal which contains flotation air inside each fluid cushion, if the hanger pressures of two interconnected cushions are forced to be identical by the interconnecting tube two lifting cushions will function as though they were a single unit.

Figure 3:
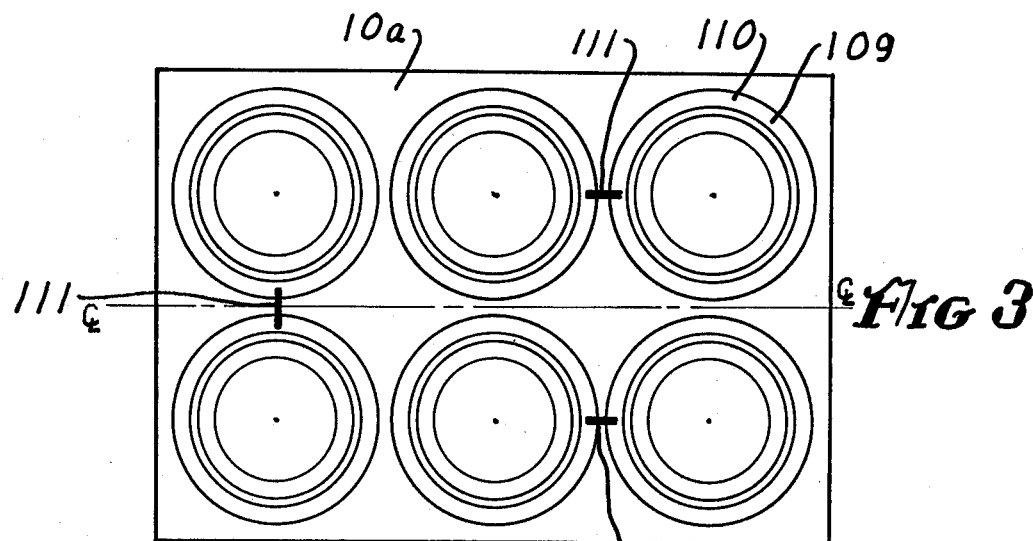
FIG. 3 is a schematic underside plan view of a load bearing structure fitted with six lifting cushions.
Figure 4:
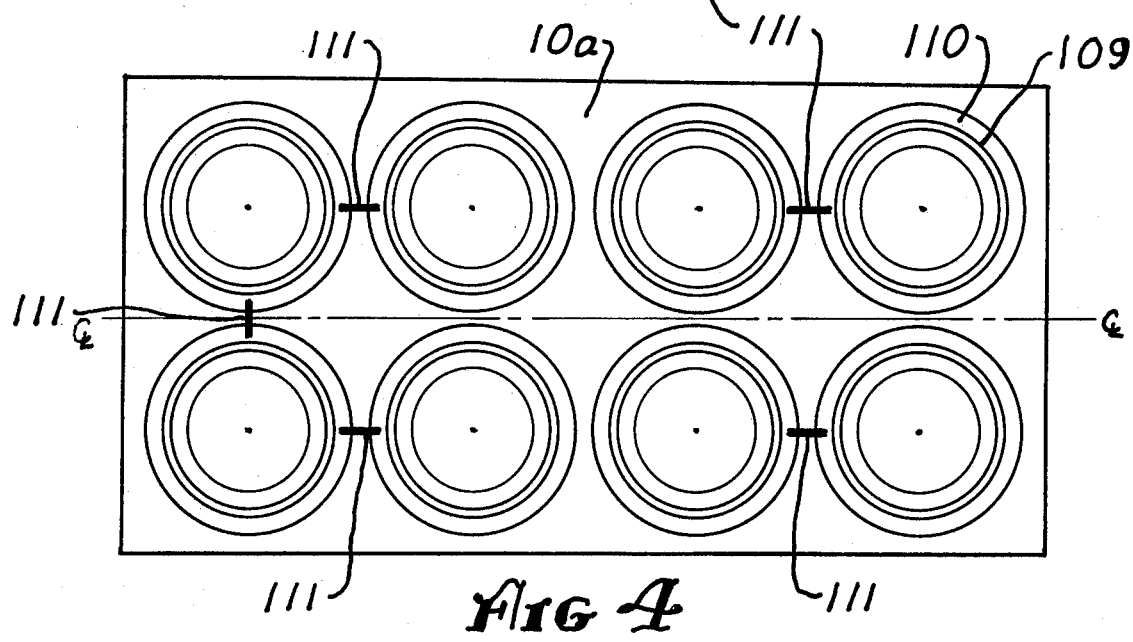
FIG. 4 is a schematic underside plan view of a load bearing structure fitted with eight lifting cushions.

It should be noted in FIG. 2 that the two interconnected fluid cushions straddle a centerline of the fluid cushion vehicle while the other two fluid cushions lie on either side of this centerline. FIG. 3 shows how adjacent fluid cushions are interconnected to provide only three supports when the load floats on six fluid cushions. FIG. 4 shows how adjacent cushions are interconnected to provide only three supports when the load floats on eight fluid cushions. In each case, the lifting cushions are interconnected so that they function as only three independent sets with one set straddling a centerline of the vehicle and the other two sets lying on opposite sides of this centerline. From the illustrations given it is clear how this process can be extended to any number of lifting cushions which are mounted under a given load.

Figure 5:
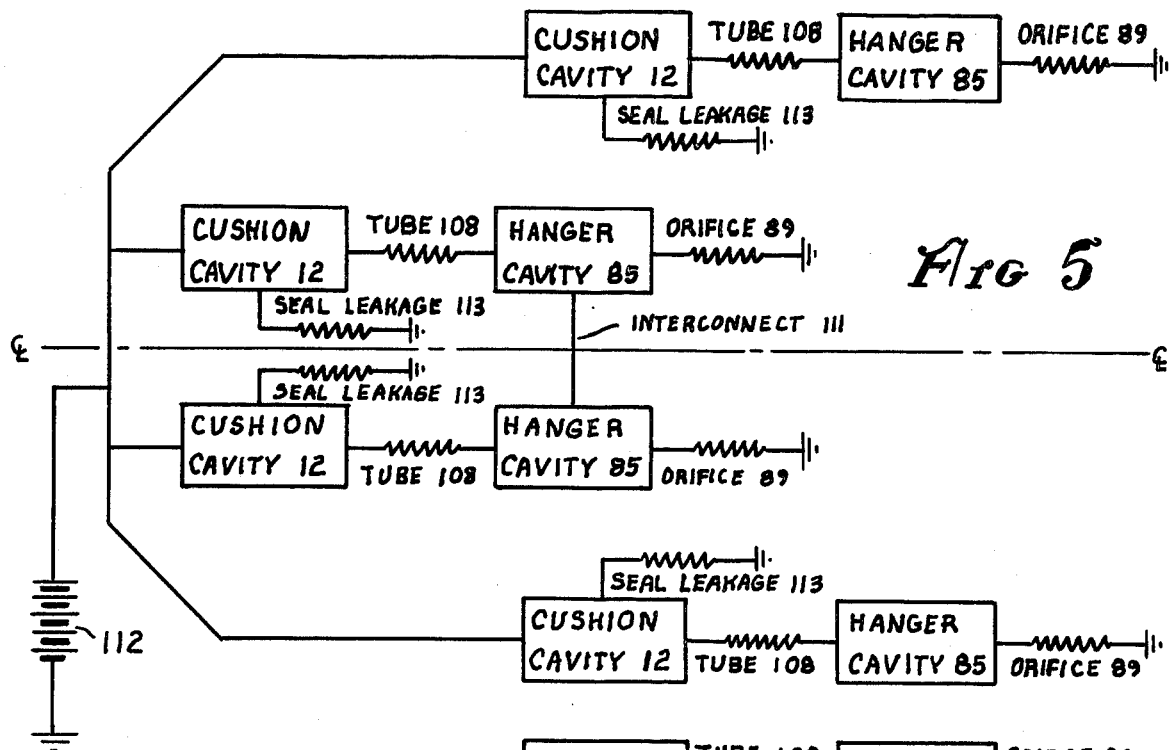
FIG. 5 is a schematic electrical analogy for the dynamic fluid system of the invention when four lifting fluid cushions are employed.
Figure 6:
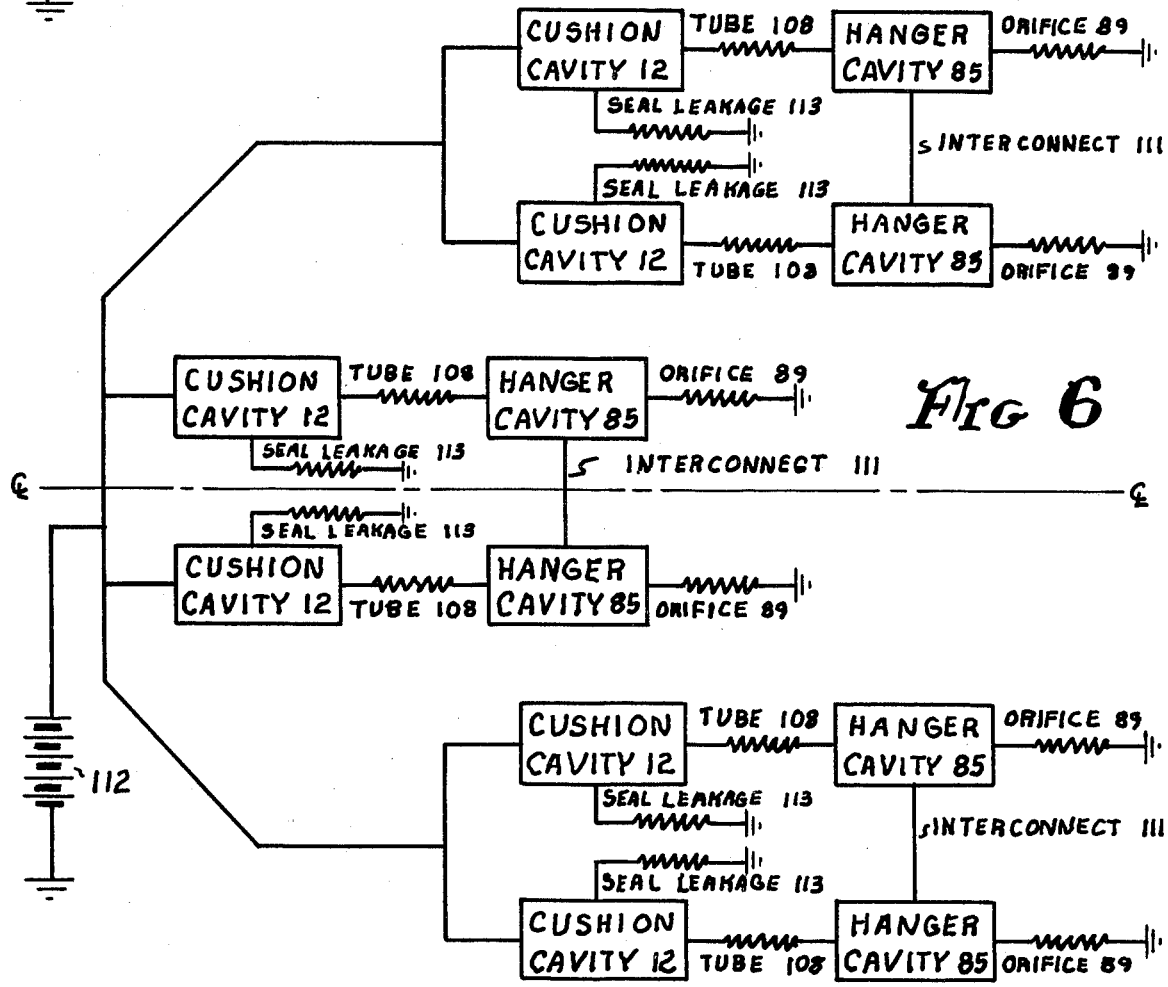
FIG. 6 is a schematic electrical analogy for the dynamic fluid system of the invention when six lifting fluid cushions are employed.
Figure 7:
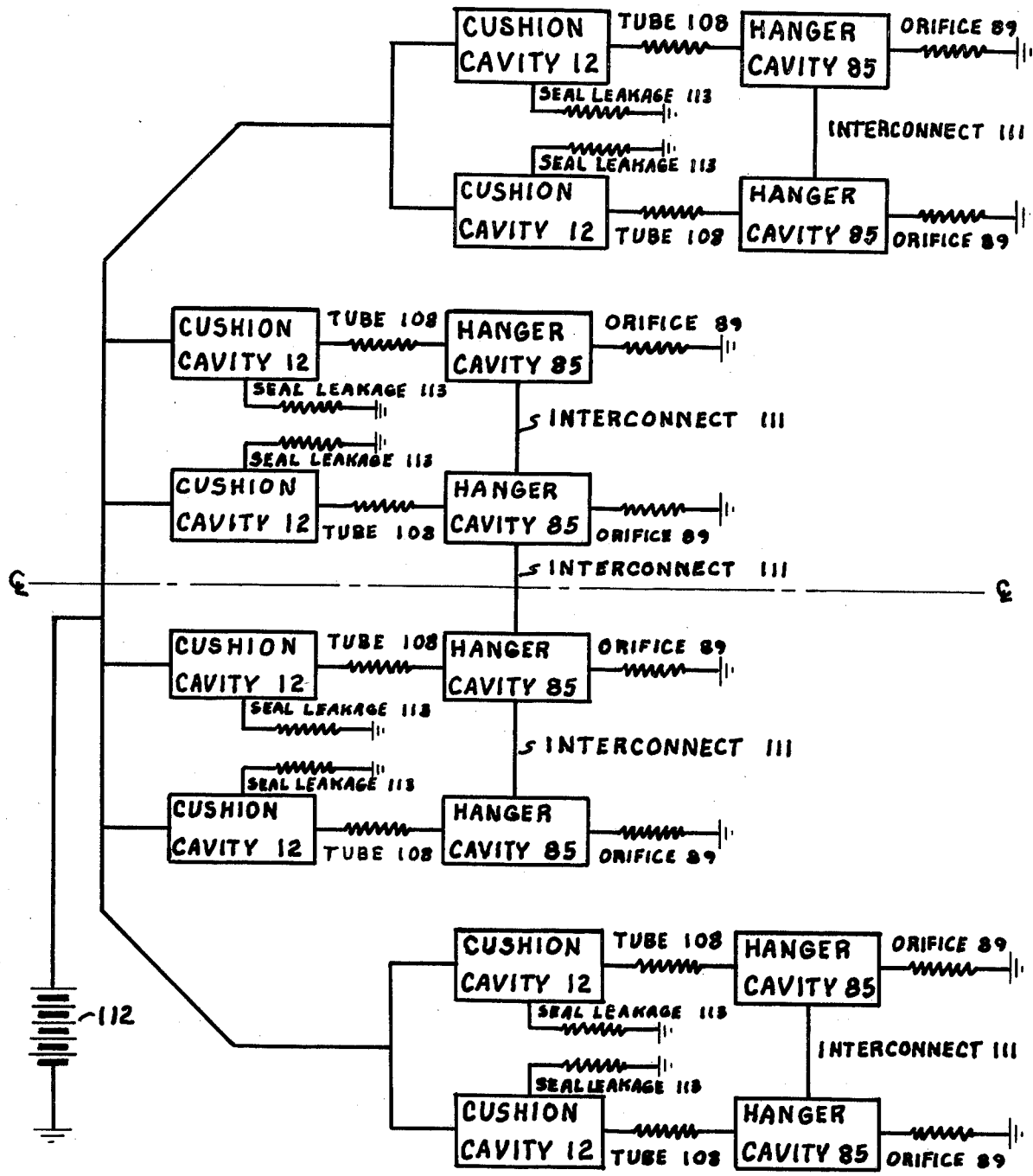
FIG. 7 is a schematic electrical analogy for the dynamic fluid system of the invention when eight lifting fluid cushions are employed.

A clear understanding of the present invention can be obtained from a study of the electrical analogies for the overall dynamic fluid system which are presented in FIGS. 5, 6 and 7. In these schematic diagrams, the source of flotation air is analogous to an electrical battery 112. Current from this battery is analogous to flotation air flow and voltage of the battery is analogous to flotation air supply pressure. After the lifting fluid cushion has been pressurized, flotation air escapes underneath the air seal to atomosphere. The air seal provides resistance to this leakage flow, however. This resistance is represented by electrical resistor 113 in the electrical analogy. In addition a small portion of the flotation air passes from each cushion cavity into its corresponding hanger envelope through small diameter inflation tube 108. Since this tube is long compared to its bore diameter, it provides resistance to this air flow. This is represented by resistor 108 in the electrical analogy. Furthermore, air can flow from the interior 85 of the hanger envelope to atmosphere through orifice 89. This orifice is represented in the electrical analogy by resistor 89. Finally, if the hanger envelopes of two air cushions are interconnected by a relatively large diameter tube 111, this tube is represented in the electrical analogy by conductor 111.

FIG. 5 gives the electrical analogy for the dynamic fluid system of a four-cushion vehicle constructed in accordance with the invention. FIG. 6 gives the electrical analogy for the dynamic fluid system of a six-cushion vehicle constructed in accordance with the invention. FIG. 7 gives the electrical analogy for the dynamic fluid system of an eight-cushion vehicle constructed in accordance with the invention.

I claim:

1. A dynamic fluid system for promoting stability in a fluid-cushion vehicle that has a plurality of fluid cushion cavities defined at least in part by surrounding, substantially circular, inflatable seal hanger envelopes, said system including:

means of supplying high pressure fluid to each of the cavities with a portion of the supplied fluid escaping to the atmosphere under the rim of the cavity;

passage means from each cavity to the corresponding hanger envelope to supply fluid to the envelope, the passage means being substantially longer than its bore diameter and restricting the flow to the envelope to cause a substantial pressure drop along the length of the passage means;

an outlet from each hanger envelope to the atmosphere, said outlet being restricted to maintain a pressure in the envelope that is substantially lower than the pressure in the corresponding fluid cushion cavity, said fluid cushion cavities being arranged into three groups to provide three different independent areas of support for the vehicle to support the vehicle in a statically determinant manner in which one area of support straddles a centerline of the vehicle, one of the two other areas of support being on one side of this centerline and the other of the two areas of support being on the other side of this centerline, at least one of the three areas of support including a group of at least two of the fluid cushion cavities, and passages interconnecting the hanger envelopes of said group to equalize pressures in the hanger envelopes of the group.

* * * * *